John C. Orkney, Inventor

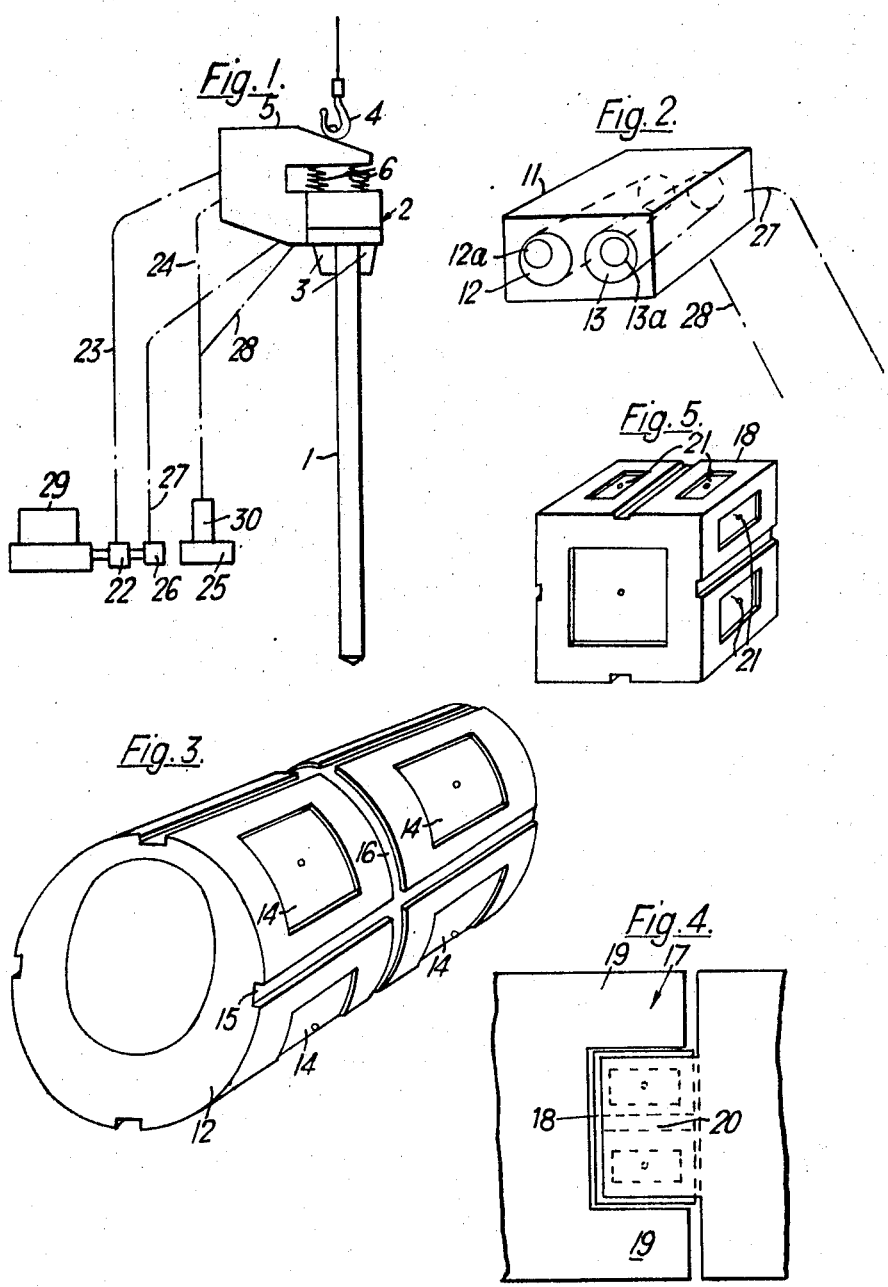

United States Patent Office 3,477,237
Patented Nov. 11, 1969

3,477,237
METHOD OF VIBRATING A MEMBER TO DRIVE IT IN A RESISTIVE MEDIUM
John C. Orkney, The Coach House, Drummond Place Lane, Stirling, Scotland
Continuation-in-part of application Ser. No. 460,171, June 1, 1965. This application Oct. 1, 1968, Ser. No. 764,099
Claims priority, application Great Britain, June 2, 1964, 22,696/64
Int. Cl. E02d 7/18; E21c 3/02; B06b 1/10
U.S. Cl. 61—53.5                    11 Claims

ABSTRACT OF THE DISCLOSURE

A method of driving a member such as a pile in a resistive medium such as earth is described. The member is biassed in a predetermined direction and a sinusoidally varying force is applied to the member while in contact with the resistive medium. The frequency of applied force is controlled so that it is always different from the fundamental natural frequency and harmonics thereof of the mass elastic system including the driven member and its driver. The controlled frequency is such that the driven member never vibrates at more than one-half the maximum amplitude at which it would vibrate if it were vibrated at that one of the instantaneous natural frequencies (fundamental resonant frequency and its harmonics) of the mass elastic system nearest to the controlled frequency.

---

This application is a continuation-in-part of my copending application Ser. No. 460,171 filed June 1, 1965 and now abandoned.

This invention relates to a method of inducing periodic stress and strain in an elongate elastic element.

The invention has numerous applications in, for example, the driving and extracting of elastic foundaiton piles, drills, mandrels and tubes into and from the ground and in the acceleration and fatigue testing of articles which may be secured to an elongate elastic element.

It is intended that the expression "ground" used herein be construed as including soils, rock, minerals, concrete, masonry, roads and similar resistive media in which piles may be driven.

According to the present invention, there is provided a method of causing an elongate elastic element to penetrate ground as hereinbefore defined in a desired direction, said method comprising aligning the element with the said direction, biassing the element in the said direction, and inducing periodic stress and strain in the element by coupling a periodic force generator to the elastic element and force-vibrating the elastic element by operating the generator at a frequency which is within a frequency range centered on a natural frequency of vibration of the elastic element together with the generator in the direction of the periodic force, the said frequency range being one throughout which dynamic amplification of periodic stress and strain in the elastic element together with the generator is modified by a change in damping factor, the magnitude of the periodic force and the value of the forcing frequency being such that the periodic stress and strain induced in the elastic element is sufficient to effect penetration of the ground by the element when the dynamic amplification is maximally one half of the maximum dynamic amplification obtainable within said frequency range for a given damping factor.

Further, according to the present invention, there is provided a method of extracting an elongate elastic element from ground as hereinbefore defined wherein the element is lodged, said method comprising biassing the element in the direction of extraction, and inducing periodic stress and strain in the element by coupling a periodic force generator to the elastic element and force-vibrating the elastic element by operating the generator at a frequency which is within a frequency range centered on a natural frequency of vibration of the elastic element together with the generator in the direction of the periodic force, the said frequency range being one throughout which dynamic amplifications of periodic stress and strain in the elastic element together with the generator is modified by a change in damping factor, the magnitude of the periodic force and the value of the said frequency being such that the periodic stress and strain induced in the elastic element is sufficient to effect extraction of the element from the ground when the dynamic amplification is maximally one half of the maximum dynamic amplification obtainable within said frequency range for a given damping factor.

Still further, according to the present invention, there is provided a method of testing the ability of an article to withstand periodic stress and strain, said method comprising securing the article to a selected station on an elongate elastic element and inducing periodic stress and strain in the element by coupling a periodic force generator to the elastic element and force-vibrating the elastic element by operating the generator at a frequency which is within a frequency range centered on a natural frequency of vibration of the elastic element together with the generator in the direction of the periodic force, the said frequency range being one throughout which dynamic amplification of periodic stress and strain in the elastic element together with the generator is modified by a change in damping factor, the magnitude of the periodic force and the value of the said frequency being such that a desired magnitude of periodic stress and strain is induced in the elastic element when the dynamic amplification is maximally one half of the maximum dynamic amplification obtainable within said frequency range for a given damping factor.

Still further, according to the present invention, there is provided a method of driving an elongated member in a resistive medium in a predetermined direction, comprising the steps of orienting said member in contact with said medium to move in said direction; biassing said member in the direction of driving and vibrating said member by applying a sinusoidally varying force to said member while the member is in contact with said medium, said member and its driver constituting a mass elastic system; said medium constituting means effective to damp vibration of said member, said mass elastic system having a fundamental natural frequency and harmonics thereof, said force having a frequency different from said fundamental natural frequency and all other natural frequencies which are harmonics of said fundamental natural frequency, said different frequency and said force being such that the maximum amplitude of vibration of said member in said medium is not more than one half the maximum possible amplitude of vibration of said member which could occur if the member were vibrated at that one of the natural frequencies of the mass elastic system nearest to said different frequency, whereby stresses generated within said member and its driver due to vibration thereof are maintained within the elastic limits of said member and its driver so that self-destructive vibration of said member and its driver is avoided should the damping effect of said medium change while the member is being effectively driven in said medium.

A method of practicing the invention will now be described, by way of example, with reference to the accompanying drawings, in which:

FIG. 1 is a diagrammatic view of pile driving apparatus including a periodic force generator operable in accordance with the present invention, the generator having an elastic foundation pile coupled thereto.

FIG. 2 is a perspective view of part of the generator of the apparatus of FIG. 1.

FIG. 3 is a perspective view of a rotor of FIG. 2.

FIG. 4 is a side elevation of means for coupling the generator to the drive therefor.

FIG. 5 is a perspective view of a coupling block.

Figure 6:
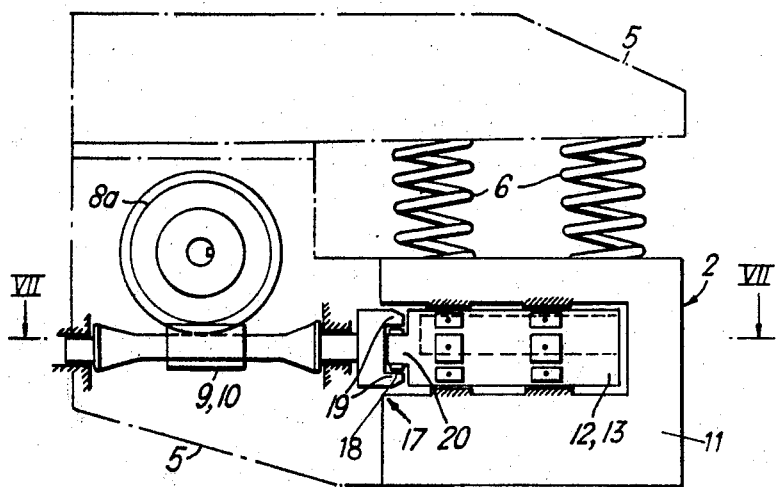
FIG. 6 is a part sectional side view, to an enlarged scale, of part of the apparatus shown in FIG. 1.

Referring to the drawing, and primarily FIG. 1, there is shown an apparatus for inducing a desired magnitude of periodic stress and strain in an elongate elastic element in the form of an elastic foundation pile 1, which comprises a periodic force generator 2 coupled to the top of the pile 1 by means of clamp blocks 3. A crane jib (not shown) has a supporting hook 4 to which is attached a block 5, the generator 2 being suspended from the block 5 by springs 6 which form a vibration isolation suspension in that the natural fundamental frequency of the springs is much less than that of the generator 2 together with the pile 1.

Thus, during operation when the generator is being operated near a natural frequency of the pile 1 together with the generator 2, the springs 6 isolate the block 5 and the jib (not shown) from vibration. The block 5 carries a drive for the generator and this drive comprises a hydraulic motor 7 (FIG. 7) of the swash plate type. The motor 7 drives a shaft 8 having two similar wormwheels 8a keyed thereto and spaced apart thereon. The wormwheels mesh with right and left hand worms 9, 10 respectively, and these worms 9, 10 are journalled in the block 5.

Figure 7:
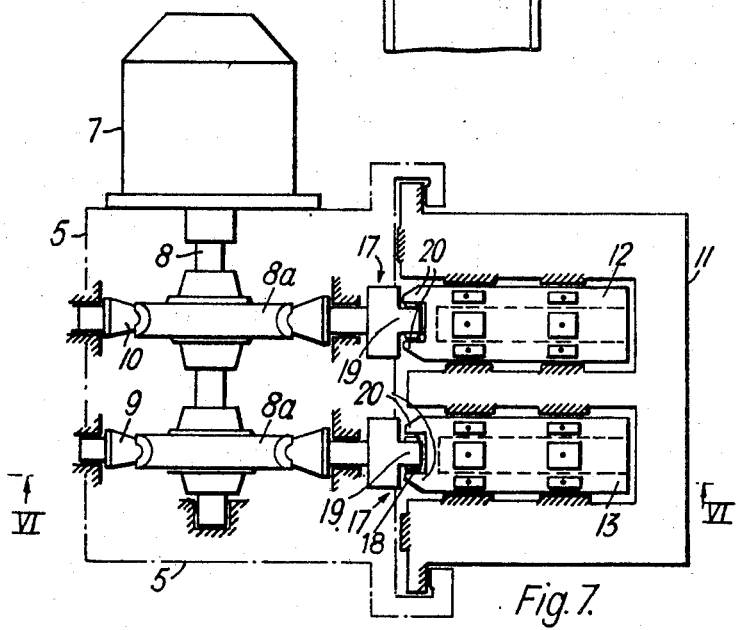
FIG. 7 is a sectional plan taken on line VII—VII of FIG. 6.

The generator 2 comprises, as can be best seen in FIGS. 2 and 7, a rectangular block 11 in which there are rotatably contained in two parallel bores, two out of balance cylinders 12, 13. The out of balance of each cylinder is achieved by having an eccentrically positioned axial bore 12a, 13a in each cylinder 12, 13. These eccentric bores may have plugs of metal of a density different from that of the cylinder. The cylinders 12, 13 are hydrostatically journalled in the block 11 and are provided with shallow pockets 14 to which oil is supplied through the cylinder. Since, in pile driving, the speed of rotation is high, use is made of this to provide additional pumping of the bearing fluid. Each cylinder 12, 13 is provided with longitudinal and circumferential grooves 15, 16 to allow oil to escape from the hydrostatic bearing. Centrifugal effect assists the oil flow through the bearing and another advantage to be gained from supplying the oil to the cylinder 12, 13 is that the cylinders 12, 13 are kept cool because the oil is cool when supplied thereto. In this way, the required fine bearing clearance is maintained.

The cylinders 12, 13 are connected to the respective right and left hand worms for contra-rotation thereby. The out of balance of the cylinders 12, 13 is phased so that a sinusoidally varying vertical force is produced when the cylinders are driven; this force is applied to the pile. The connection between each worm and cylinder includes a floating block coupling indicated at 17, and shown in more detail in FIG. 4. Each coupling comprises a floating block 18 trapped between a pair of jaws 19 on the worm and a pair of jaws 20, normal to said first mentioned jaws 19, on the cylinders, said pairs of jaws 19, 20 slidably supporting the floating block 18. Fine clearances between jaws and block exist and in order to provide lubrication to allow the large amount of relative sliding which must take place between jaw and block, high pressure oil is supplied to pockets 21 on the block bearing surfaces, two per face, through orifices or capillaries, thus creating a hydrostatic oil-lift support for the block 18. These couplings are necessary in as much as the block 11 is reciprocating during operation and it is not desired to transmit accelerations to the drive motor and gearing. The coupling 17 described copes with this in that a sliding movement between block 18 and jaws 19, 20 can take place freely.

Reverting to FIG. 1, pressure oil is supplied to the hydraulic motor by a pump 22 through a pipeline 23 and exhausted therefrom through an exhaust pipeline 24 to sump 25. A pump 26 supplies pressure oil to the cylinders and couplings through supply and exhaust lines 27, 28. Both pumps 22, 26 are driven by an internal combustion engine 29 and the oil entering the sump from both exhaust lines 24, 28 is cooled by a cooler 30.

Figure 8:
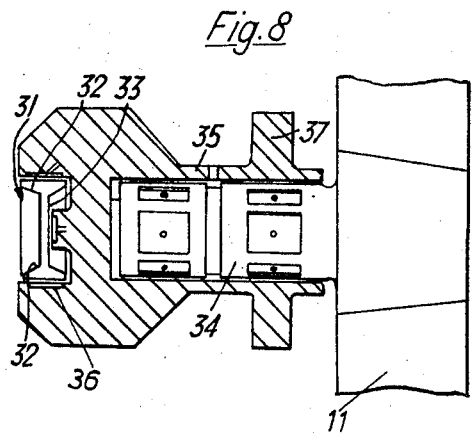
FIG. 8 is a side view showing a modification.

A modified form of floating coupling block is shown in FIG. 8. In this case, the block 31 is made up of four side flanges 32 and a central web 33, so that the block is I sectioned between flange outer surfaces. Moreover, the cylinders 32 are formed on stub axles which are non-rotatable, the out of balance being provided by a sleeve 35 having jaws 36 which locate the block 32, 33 and having an out of balance weight 37.

The apparatus is preferably provided with a limiting device to ensure that the amplitude of vibration does not become excessive and this limiting device may be in the form of a spool valve conditioned in proportion to the position of the generator relative to the stationary parts of the apparatus. The valve may control the supply of pressure oil to the motor 7 so as to control the speed and hence amplitude of the vibration.

In operation of the apparatus, the motor 7 is driven by pressure oil supplied thereto from the pump 22, and in turn, the cylinders 12, 13 are rotated in opposite directions. This contra-rotation produces, as is well known, a periodic force in the form of a sinusoidally varying force between the out of balance masses. In this case the sinusoidal force varies vertically, horizontal forces cancelling, and longitudinal periodic stress is induced in the elastic material of the pile. It is known to rotate out of balance masses to produce a sinusoidally varying force at a fundamental natural frequency, or at a harmonic of the fundamental natural frequency of the mass elastic system, that is, the mass is vibrated (including the pile) so as to produce anti-nodes at the upper and lower ends of the pile. Anti-nodes are points of maximum stress and strain and this is made use of in driving or extracting the pile from the earth.

In accordance with the present invention, an essential of the method of operating is that the frequency of application is not the fundamental natural frequency, or any harmonic thereof. Anti-nodes are still produced at the upper and lower ends, but the limiting feature is that a maximum of half of the possible dynamic amplification is used. In other words, the forcing frequency is such that the amplitude of motion at the lower end of the pile is no greater than one half of the possible maximum at the nearest natural frequency. By running the apparatus in this way, destruction of the vibrator assembly or the pile due to excessively high values of stress and strain is avoided should a reduction in damping factor occur during operation.

Figure 9:
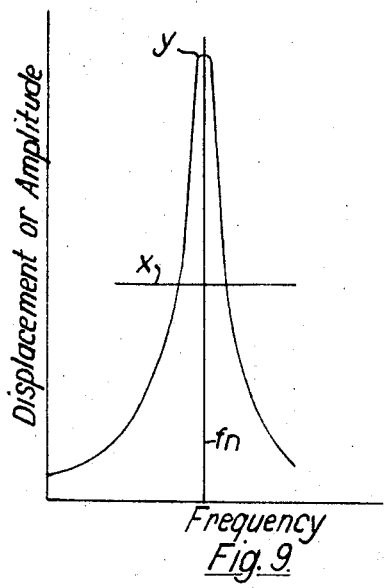
FIGS. 9 and 10 are frequency-displacement graphs.
Figure 10:
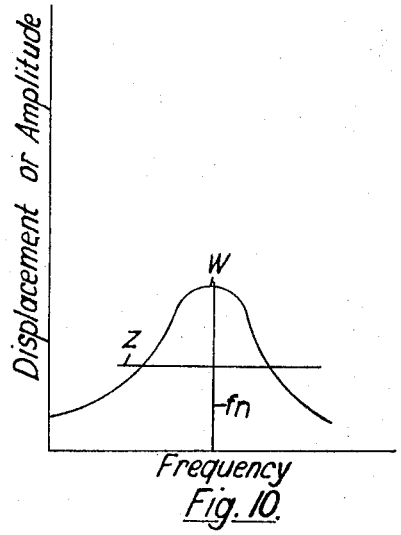

Referring to FIGS. 9 and 10, these show, respectively, frequency displacement curves for a low damping system (FIG. 9) and a high damping system (FIG. 10). The line $x$ in FIG. 9 illustrates the maximum amplitude (or dynamic amplification) attained in applying the present invention, in relation to the high amplification $y$ at the nearest natural frequency $fn$. Similarly, in FIG. 10 the maximum amplitude $w$ is lower than in FIG. 1, but again only half of this amplitude is used as illustrated by the line $z$. It can thus be seen that by operating at a frequency in accordance with the present invention, a change in damping factor results in a relatively small change in dynamic amplification of stress and strain.

When the pile is vibrating and the lower end, being an anti-node, is brought into contact with the ground, analgous stresses are set up in the ground causing it to fail and permitting the pile to penetrate. The periodic stress and strain induced in the pile tip is chosen so that failure of the ground will be rapid and certain. By controlling the speed of rotation of the cylinders so as to provide a dynamic amplification which is maximally half the possible amplification, the stress may be kept more accurately than hitherto within the elastic limits of the materials of which the pile and generator are made; and therefore the magnitude of the applied periodic force may be such as to induce a desired high stress and strain with a reduced risk of exceeding the said elastic limits.

The frequency of operation is well above the natural frequency of the ground and, therefore, no shock waves are transmitted through the ground and the structures of surrounding buildings are not damaged. When the lower end of the pile has caused the ground to fail locally, the weight of the pile and generator plays a part in causing the pile to penetrate. The weight of the pile and generator may be augmented by additional weights or thrust from any suitable device. In applications where the pile is light, or is required to penetrate horizontally or at any other angle, the provision of thrust in the desired direction of motion becomes important. In extraction a crane may be used. It will of course be known that the fundamental and harmonic natural frequencies will vary as the pile penetrates the earth and the periodic force must be varied accordingly to avoid a resonant condition.

Control of the periodic force may be effected quite simply as the force is proportional to the out of balance means, the square of the velocity of the mass and inversely proportional to the radius of the mass. One method employs two geared eccentrically bored plugs, one being located in each bore 12a, 13a. Alteration of the setting of the plugs alters the radius of the out of balance force. An alternative method employs two pairs of cylinders and correct phasing thereof varies the periodic force. A differential gear may be employed to vary the phasing.

Moreover, where it is desired to use a constant speed driving motor, the apparatus could be arranged to run at a speed of vibration which produces half or less of maximum possible amplification at the nearest natural frequency by attaching weights to the mass-elastic system at suitable points for example at an anti-node, or by varying the length of the pile. These methods are attractive in the case of drills or cutters having bits attached to the end of the vibrating column whether the drill or bit or cutter forms part of the elastic element or is merely a mass on its end.

Also, a re-entrant pile may be used where it is desired to save length. A re-entrant pile may be for example two tubes, one inside the other, and joined at one end, the total length of the pile being equal to the equivalent simple pile.

When using the apparatus for the acceleration or fatigue testing of instruments or other equipment, the instrument under test is attached to an elongate elastic element in the form for example, a bar, at any point along the bar's length, which gives the desired acceleration.

In addition, the contra-rotating cylinders can be arranged to produce transverse or torsional vibrations in the elastic element.

I claim:
1. A method of causing an elongate elastic element to penetrate ground as hereinbefore defined in a desired direction, said method comprising aligning the element with the said direction, biassing the element in the said direction, and inducing periodic stress and strain in the element by coupling a periodic force generator to the elastic element and force-vibrating the elastic element by operating the generator at a frequency which is within a frequency range centered on a natural frquency of vibration of the elastic element together with the generator in the direction of the periodic force, the said frequency range being one throughout which dynamic amplification of periodic stress and strain in the elastic element together with the generator is modified by a change in damping factor, the magnitude of the periodic force and the value of the forcing frequency being such that the periodic stress and strain induced in the elastic element is sufficient to effect penetration of the ground by the element when the dynamic amplification is maximally one half of the maximum dynamic amplification obtainable within said frequency range for a given damping factor.

2. The method according to claim 1, wherein the said periodic force is applied in the longitudinal direction of the elastic element.

3. The method according to claim 1, wherein the elongate elastic element is a foundation pile.

4. A method as defined by claim 1, wherein the fundamental natural frequency and harmonics thereof of said elastic system vary as said member moves in said medium, said method comprising the further step of so varying said different frequency that said different frequency is always different from the fundamental natural frequency of the mass elastic system and from all harmonics thereof, and is always such that the maximum amplitude of vibration of said member in said medium is never more than one half the maximum possible amplitude of vibration of said member which could occur if the member were vibrated at that one of the natural frequencies of the mass elastic system nearest to said different frequency, so that the member moves in said medium in said direction while self-destructive vibration of said member and its driver are continuously avoided.

5. A method as defined in claim 1, wherein said predetermined direction is away from said medium.

6. A method according to claim 1, wherein said force is applied to said member in the longitudinal direction thereof.

7. A method as defined by claim 1, wherein said driver includes two contra-rotating masses, and wherein said method further comprises suppressing forces generated by said driver in all directions other than said predetermined direction so that said sinusoidally varying force is generated as the resultant of forces generated by said contra-rotating masses.

8. A method of extracting an elongate elastic element from ground as hereinbefore defined wherein the element is lodged, said method comprising biassing the element in the direction of extraction, and inducing periodic stress and strain in the element by coupling a periodic force generator to the elastic element and force-vibrating the elastic element by operating the generator at a frequency which is within a frequency range centered on a natural frequency of vibration of the elastic element together with the generator in the direction of the periodic force, the said frequency range being one throughout which dynamic amplification of periodic stress and strain in the elastic element together with the generator is modified by a change in damping factor, the magnitude of the periodic force and the value of the said frequency being such that the periodic stress and strain induced in the elastic element is sufficient to effect extraction of the element from the ground when the dynamic amplification is maximally one half of the maximum dynamic amplification obtainable within said frequency range for a given damping factor.

9. The method according to claim 8, wherein the said periodic force is applied in the longitudinal direction of the element.

10. The method according to claim 8, wherein the elongate elastic element is a foundation pile.

11. A method of driving an elongated member in a resistive medium in a predetermined direction, comprising the steps of orienting said member in contact with said medium to move in said direction; biassing said member in the direction of driving and vibrating said member by applying a sinusoidally varying force to said member while the member is in contact with said medium, said member and its driver constituting a mass elastic system; said medium constituting means effective to damp vibration of said member, said mass elastic system having a fundamental natural frequency and harmonics thereof, said force having a frequency different from said fundamental natural frequency and all other natural frequencies which are harmonics of said fundamental natural frequency, said different frequency and said force being such that the maximum amplitude of vibration of said member in said medium is not more than one half the maximum possible amplitude of vibration of said member which could occur if the member were vibrated at that one of the natural frequencies of the mass elastic system nearest to said different frequency, whereby stresses generated within said member and its driver due to vibration thereof are maintained within the elastic limits of said member and its driver so that self-destructive vibration of said member and its driver is avoided should the damping effect of said medium change while the member is being effectively driven in said medium.

References Cited

UNITED STATES PATENTS

| | | | |
|---|---|---|---|
| 2,975,846 | 3/1961 | Bodine | 175—19 |
| 3,004,389 | 10/1961 | Muller | 173—49 X |
| 3,054,463 | 9/1962 | Bodine | 175—19 |
| 3,199,614 | 8/1965 | Bodine | 175—55 X |
| 3,215,209 | 11/1965 | Desvaux et al. | 175—55 X |
| 3,262,507 | 7/1966 | Hansen | 175—56 |
| 3,280,924 | 10/1966 | Pavlovich | 175—55 |
| 3,291,227 | 12/1966 | Bodine | 175—55 |

FOREIGN PATENTS 968,379   9/1964   Great Britain.

ERNEST R. PURSER, Primary Examiner

U.S. Cl. X.R.

73—67.3; 74—61; 173—49; 175—19, 55